United States Patent [19]

Kitano et al.

[11] Patent Number: 4,856,634
[45] Date of Patent: Aug. 15, 1989

[54] CLUTCH

[75] Inventors: Seiichi Kitano; Yasunobu Fukatani; Masaaki Asada; Kazuhiko Yoneda, all of Neyagawa, Japan

[73] Assignee: Kabushiki Kaisha Daikin Seisakusho, Osaka, Japan

[21] Appl. No.: 169,200

[22] PCT Filed: Jun. 10, 1987

[86] PCT No.: PCT/JP87/00375
§ 371 Date: Feb. 17, 1988
§ 102(e) Date: Feb. 17, 1988

[87] PCT Pub. No.: WO87/07930
PCT Pub. Date: Dec. 30, 1987

[30] Foreign Application Priority Data

Jun. 17, 1986 [JP] Japan .................................. 61-142141

[51] Int. Cl.$^4$ ..................... F16D 13/38; F16D 13/50; F16D 23/14
[52] U.S. Cl. ..................... 192/70.3; 192/98; 192/99 A
[58] Field of Search ..................... 192/70.25, 98, 70.3, 192/99 A

[56] References Cited

U.S. PATENT DOCUMENTS

| 1,734,767 | 11/1929 | Gamble | 192/70.25 |
| 1,797,515 | 3/1931 | Schoenrock | 192/70.25 |
| 2,040,034 | 5/1936 | Tatter | 192/70.25 X |
| 3,394,788 | 7/1968 | Sink | 192/99 A X |
| 4,720,002 | 1/1988 | Kitano et al. | 192/70.25 |
| 4,754,860 | 7/1988 | Fukutake et al. | 192/70.25 |

Primary Examiner—Rodney H. Bonck
Attorney, Agent, or Firm—Armstrong, Nikaido, Marmelstein, Kubovcik & Murray

[57] ABSTRACT

A pull-type clutch which is released by pulling a release bearing toward the transmission with a releasing lever connected to a clutch pedal, includes clutch discs which are spline fitted onto an input shaft of a transmission. A sleeve part of a releasing retainer is provided on an outer periphery of the input shaft with a release bearing fastened to the transmission and of the sleeve part. A retainer part is integrally formed into one piece with the sleeve part and is located at the flywheel end of the sleeve part. A spline is provided on the sleeve part and fits into a spline groove on the clutch cover for permitting axial sliding of the releasing retainer while preventing rotation of the releasing retainer relative to the clutch cover.

4 Claims, 5 Drawing Sheets

CLUTCH

DESCRIPTION

1. Technical Field

This invention relates to a pull-type clutch which is released by pulling a release bearing toward a transmission side by means of a releasing lever connected to a clutch pedal.

2. Background Art

In such a conventional clutch, as shown by FIG. 4, a slantly disposed coil spring 100 is employed as a load generating member for transmitting a spring force to a retainer to apply a pressing force on a clutch disc 108 from the retainer 102 through a lever 104 to a pressure plate 106 (Japanese Examined Pat. publication No. 46-15046 based on U.S. patent application Ser. No. 549,009, now U.S. Pat. No. 3,394,788).

However, such conventional clutch has a problem in that the spring force of the coil spring 100 causes the pedal depressing force to increase with an increase in a stroke of the clutch pedal. This to an increase in the pedal depressing force at the time of releasing of the clutch.

A further problem is that, at the time of high-speed rotation, centrifugal force acting on the coil spring 100 compresses the coil spring 100 to reduce the spring force applied on the pressure plate 106.

The applicants of this application have developed a new clutch which overcomes such problems in the such pull-type clutch, and have filed patent application on such of new clutch (U.S. patent application Ser. No. 900,655, now U.S. Pat. No. 4,720,002, dated Jan. 19, 1988, based on Japanese patent application No. 60-194158).

In applicants prior '655 application, as shown in FIG. 5, a diaphragm spring 110 is used. Such diaphragm spring 110 is held on a clutch cover 116 by means of wire rings 112 and a stud pin 114. A retainer 111 is spine fitted on a sleeve 113 and the clutch cover 116 and the retainer 111 are assembled with studs 117 to rotate as one piece.

However, there is a problem in the clutch of such '655 U.S. application in that the machining cost are high, because it is necessary to work a milling machining on the studs 117 of the clutch cover 116.

DISCLOSURE OF THE INVENTION

An object of the invention is to provide a clutch, which can reduce the costs of machining in a so-called pull-type clutch.

COMPOSITION OF THE INVENTION

(1) Technical measure

In a clutch carrying out a releasing operation so as to pull a release bearing away from a flywheel by means of a releasing lever connected to a clutch pedal; a clutch disc is spline fitted onto an input shaft of a transmission side, a sleeve part of a releasing retainer is provided on an outer periphery of the input shaft, a release bearing is fastened to a transmission side end of such sleeve, the load transmission part of the releasing retainer is formed into one piece continuously with the sleeve part with the releasing retainer at the flywheel side end of the sleeve part; a clutch cover is connected to the flywheel and covers the pressure plate for pressing the clutch disc into engagement with the flywheel; a disc-formed spring member is disposed between the clutch cover and the retainer part; a lever for transmitting spring force from the spring member to the pressure plate is disposed between the retainer and the pressure plate; a spline is provided on the releasing retainer and is splined to the clutch cover for permitting axially sliding of the releasing retainer while preventing rotation of the releasing retainer.

(2) Function

Because the sleeve part and the retainer part are integrally formed into one piece the number of parts are reduced, and machining costs are reduced.

The releasing retainer can slide axially and rotates integrally with the clutch cover because of the fit of the releasing retainer and the clutch cover by the spline part.

BEST MODE FOR CARRYING OUT THE INVENTION

Figure 1:
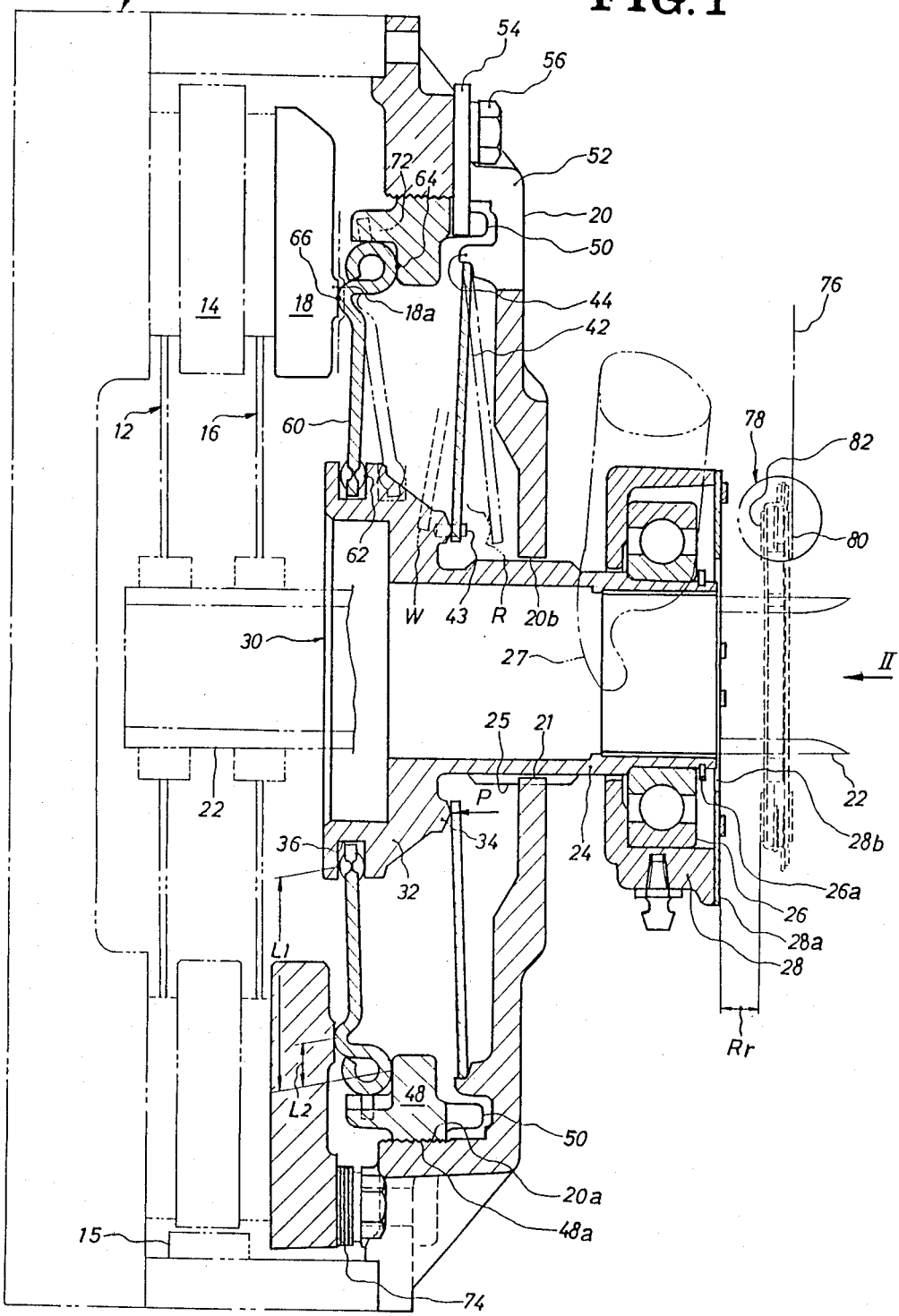
FIG. 1 is a vertical sectional view of a clutch according to the present invention.

In FIG. 1, a vertical sectional view of the clutch according to the present invention taken at the line A-O-A, FIG. 1, 10 is a flywheel. A clutch disc 12, an intermediate plate 14 and a clutch disc 16 are pressed to the back face of flywheel 10 by pressure plate 18. A pin 15 is fixed to the flywheel 10 radially outside of the intermediate plate 14 for rotating the intermediate plate 14 with flywheel 10.

Clutch cover 20 covers pressure plate 18 at the rear side of the pressure plate 18. The clutch cover 20 is formed into a thick wall by forging, for example. The clutch discs 12 and 16 are spline fitted onto an input shaft 22 of a transmission to the rear of the clutch, i.e., to the right in FIG. 1.

Sleeve part 24 of releasing retainer 30 fits axially slidingly onto the radial outer periphery of the input shaft 22. A release bearing 26 is fastened by a snap ring 26a to a rear or a transmission side end of the cylindrical sleeve 24. A bearing holder 28, covering the release bearing 26, is provided at the outside of the release bearing 26. A pressing plate 28a is fixed to a rear end face of the bearing holder 28. a through hole 28b, through which the input shaft 22 passes, is provided on the pressing plate 28a.

Outer spline tooth 25 is formed on the outer surface of the sleeve part 24 and engages the inner spline tooth 21 formed on the through hole 20b of the clutch cover 20. Accordingly, releasing retainer 30 is splined to clutch cover 20 for rotation herewith and for axial sliding with respect thereto.

Releasing lever 27 is connected to a clutch pedal (not shown) for shifting the release bearing 26 in the axial direction.

A retainer part 32 is formed integrally with sleeve 24, in one piece, at a front end portion of the sleeve part 24 and extends radially outwardly and make up releasing retainer 30.

When the release bearing 26 is shifted rearward, i.e., to the right in FIG. 1, the sleeve part 24 moves rearward together with the retainer part 32. The retainer part 32 is pulled to a position R shown by alternate long and two short dashes line, FIG. 1.

The retainer part 32 is formed into approximately annular shape. a pressing part 34 projects to rearward, at a rear face side portion of the retainer part 32, over the entire periphery. An annular groove 36 is formed at the front face side portion.

Figure 2:
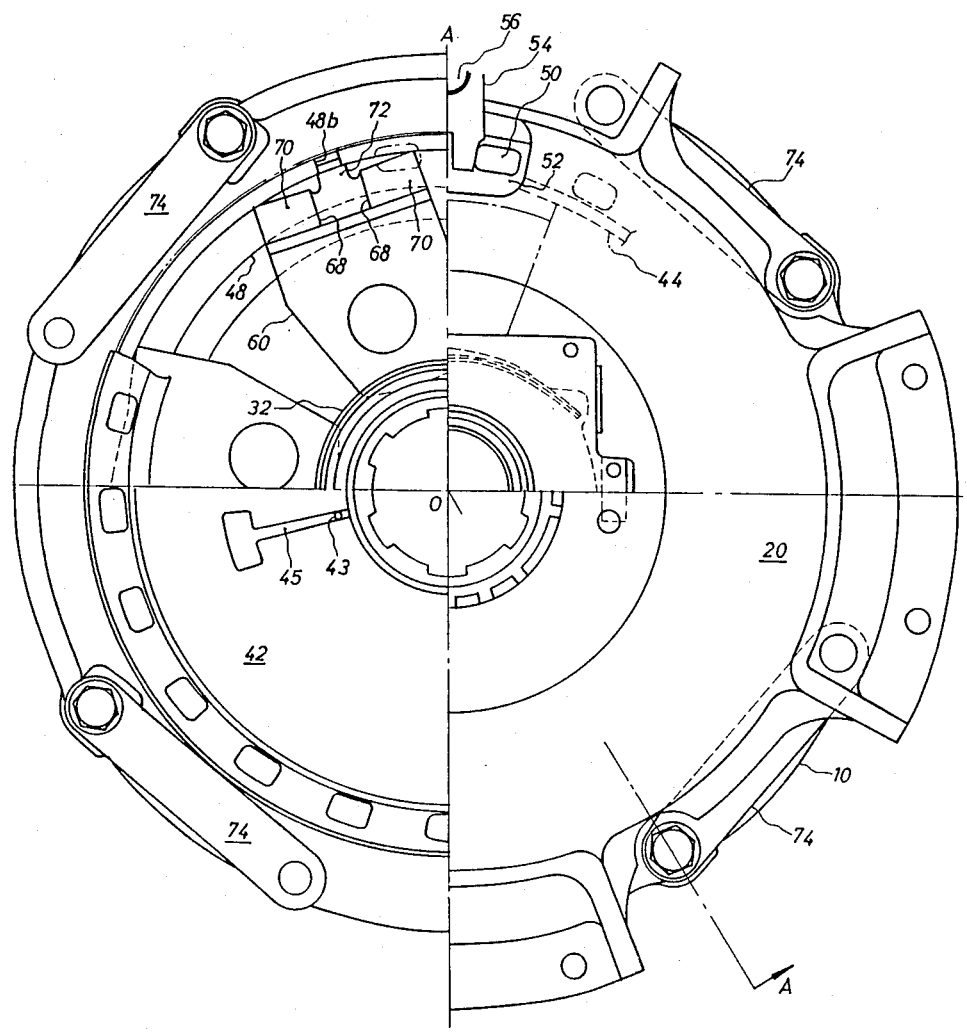
FIG. 2 is an end view of the clutch of FIG. 1 in the direction of arrow II FIG. 1.

A diaphragm spring 42 (spring member) is installed between the clutch cover 20 and the retainer part 32 and is formed into approximately disc-shaped. An outer peripheral portion of the diaphragm spring 42 is held to the clutch cover 20 by a projection 44 of the clutch cover 20. As shown in FIG. 2, the projection 44 is formed approximately ring-shaped over the entire periphery except for recess 52 of the clutch cover 20.

An inner peripheral portion of the diaphragm spring 42 presses on the pressing part 34 of the retainer part 32 and is connected to pressing part 34 of the retainer part 32 by a rolled pin 43. Rolled pins 43 are provided at different cross sectional position in the peripheral direction from the cross sectional position shown by FIG. 1.

As shown in FIG. 2, the rolled pin 43 fits through a slit 45 of the diaphragm spring 42. Further, the rolled-pins 43 and the slits 45 are disposed at three place 120 degrees apart in the circumferential direction.

As shown in FIG. 1, a threaded part 20a is formed on an inner peripheral face of the clutch cover 20 radially outside diaphragm spring 42. A threaded part 48 of approximately annular adjuster ring 48 is threaded to the threaded part 20a.

Projections 50 are formed at twenty-four places, for example, on a rear end face of the adjuster 48 with equal distance therebetween in the circumferential direction. The projections 50 are formed at a radially outer peripheral part of the adjuster ring 48.

Holes 52 are formed on the clutch cover 20 corresponding to the projections 50. Lock plates 54 are fastened by a bolt 56 at the holes 52. Lock plate 54 engages with the projection 50. The adjuster ring 48 and the clutch cover 20 are integrally coupled through the lock plates 54 while permitting axial positional adjustment of the adjuster ring 48.

Levers 60, for releasing operation, are disposed at six places between the pressure plate 18 and the retainer 32 with equal distances left therebetween in the circumferential direction. An inner peripheral side fulcrum 61 of the lever 60 fits in the annular groove 36, an outer peripheral side fulcrum 64 presses on a front end face of the adjuster ring 48 and an intermediate fulcrum 66 presses on a fulcrum land 18a of the pressure plate 18. Lever ratios of inner peripheral side fulcrums 62, outer peripheral side fulcrums 64 and intermediate fulcrums 66 are set to L1 and L2.

Figure 2A:
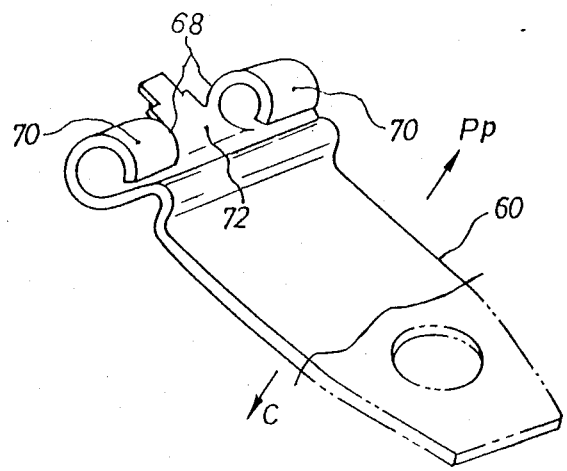
FIG. 2a is a perspective view of the lever.

Lever 60 is a component made, for example, by plate working. As shown in FIG. 2 and FIG. 2a, two cut lines 68 are formed at a radially outer peripheral part of the lever 60. The outer peripheral side fulcrum 64 and intermediate fulcrum 66 (FIG. 1) are formed by bending external pieces 70. The central piece 72 of the central portion, extending radially outwardly, fits in a recessed part 48b of the adjuster ring 48. Arrow P;, FIG. 2a, indicates the direction of the pressure plate 18 and arrow C indicates the direction of the clutch cover 20.

The lever 60 is described in applicants' Japanese patent application Ser. No. 61-36034.

Well-known circumferentially extending strap plates 74 are disposed at four places between an outer peripheral part of the pressure plate 18 and the clutch cover 20, with equal distances left therebetween, in the circumferential direction.

An inertia clutch brake 78 is interposed between the pressing plate 28a of FIG. 1 and a transmission side end face 76 and is spline fitting onto the input shaft 22.

The inertia clutch brake 78 has facings 80 and 82 on its opposite end faces. A releasing allowance Rr is provided between the facing 82 and the pressing plate 28a.

Figure 5:
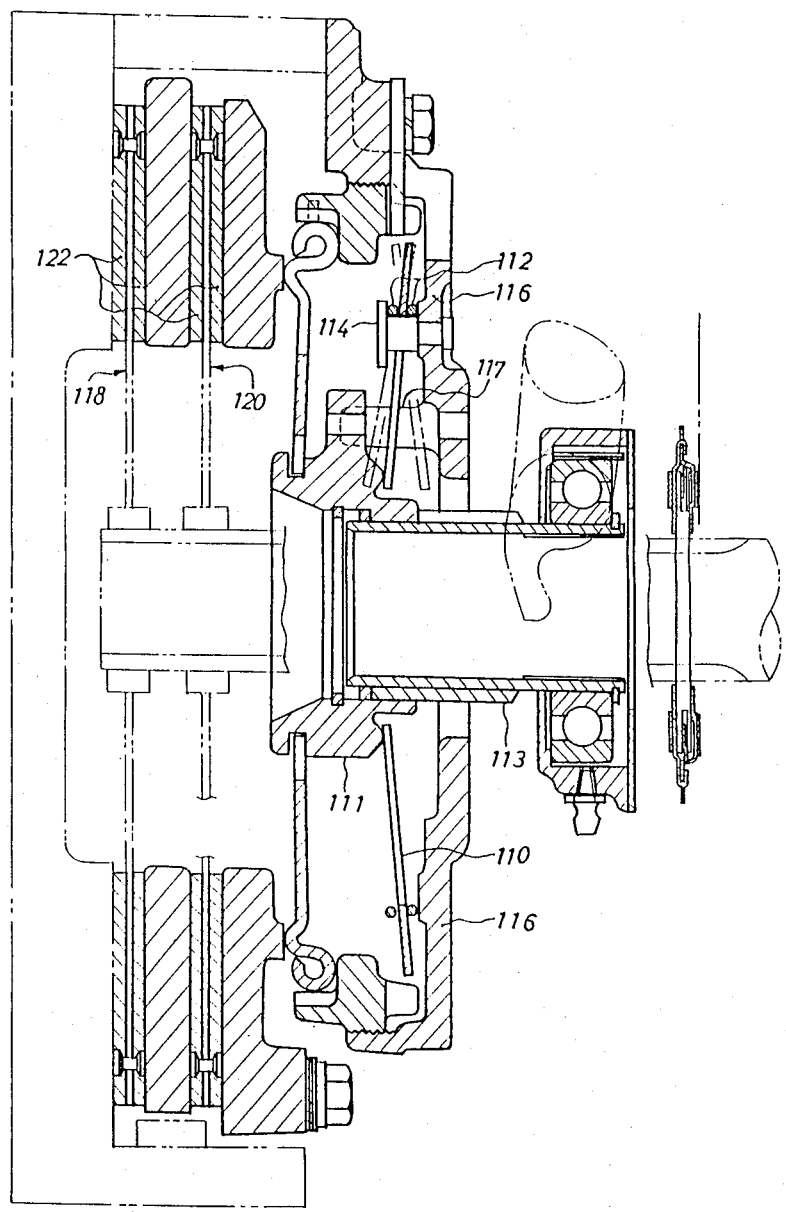
FIG. 5 is a vertical sectional view of the clutch of the prior '655 U.S. application of by the applicants of the present invention.

In the foregoing embodiment, machining costs are cheaper compared with the costs of the pull-type clutch shown in FIG. 5. Because, the clutch cover 20 and the releasing retainer 30 are splined fit by the outer spline tooth 25 and the inner spline tooth 21, there is no need for the tubs 117 (FIG. 5) and the milling thereof.

Because the sleeve part 24 and the retainer part 32 are formed integrally, structure of the releasing retainer 30 simpler than in the prior art.

There is not need of machining work to form the spline part, and the cost of machining is less expensive.

In an initial setting state, as shown by solid line in FIG. 1, a spring force P of the diaphragm spring 42 presses the pressing part 34 of the retainer 32 in the forward direction.

Spring force P is transmitted from the inner peripheral side fulcrum 62 of the annular groove 36 to the lever 60 and is magnified to about three times, for example, with the lever ratio L1:L2 when transmitted to pressure plate 18 and clutch discs 12 and 16.

Because the diaphragm spring 42 is held in an approximately flat position, the diaphragm spring 42 is scarcely affected by the centrifugal force, even at a high rotation speed. There is no decrease in the pressing force applied to the clutch discs 12 and 16 because of centrifugal force.

The inner peripheral part of the diaphragm spring 42 engages to the pressing part 34 of the retainer part 32 by the rolled pin 43 and the diaphragm spring 42 rotates tegether with the retainer part 32.

When the clutch discs 12 and 16 have been worn after a long term of the operation, the pressure plate 18 moves forward and the retainer part 32 also moves forward in the same way. In this worn state, the diaphragm spring 42 comes to a W-position shown by a two-dot chain line of FIG. 1. Because the outer peripheral part of the lever 60 takes up a backwardly inclining position at this state, a normal position of the lever 60 is attained by threading the adjuster ring 48 forwardly after removing the lock plate 54.

Figure 3:
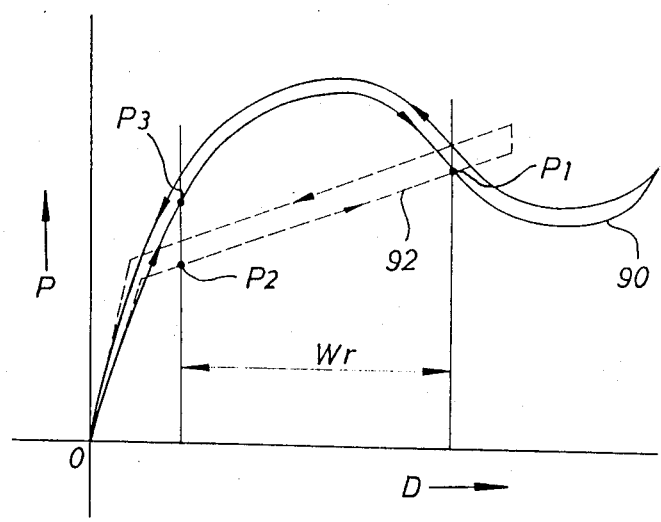
FIG. 3 is a graph showing a relation between the spring force and the distortion of the diaphragm spring in the clutch of the invention.
Figure 4:
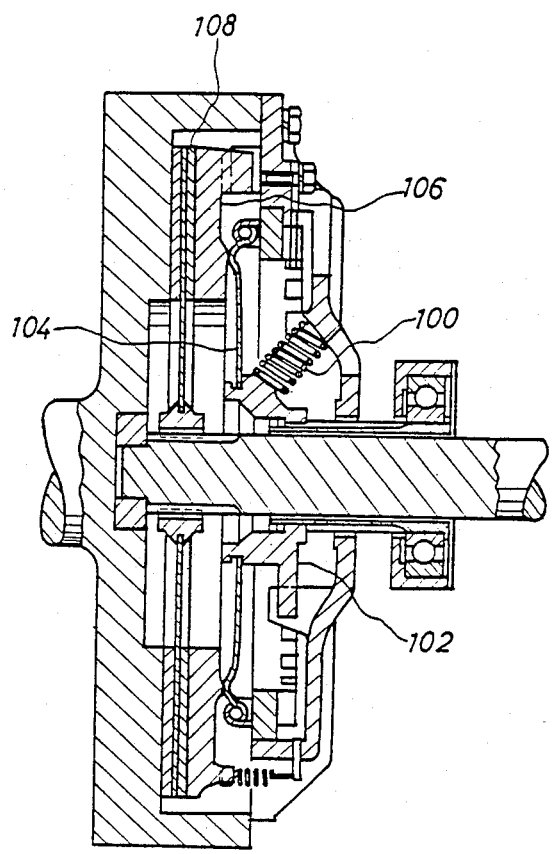
FIG. 4 is a vertical sectional view of conventional pull-type clutch.

The spring characteristic curve of the diaphragm spring 42 has an upwardly convex shape within a range of wear allowance Wr corresponding to the wear amount of clutch discs 12 and 16. The spring characteristic curve 90 of FIG. 3 representing a relation between the distortion D and the spring force P so that the spring force P generated by the diaphragm spring 42 becomes larger than of a characteristic curve 92 for a conventional coil spring 100 (FIG. 4). The pressing force of the pressure plate 18 on the clutch discs 12 and 16 increases as compared with the conventional arrangement.

When the clutch discs 12 and 16 are worn, the spring force decreases from a setting load P1 to a worn-down load P2 in the characteristic curve 92, but it decreases from the setting load P1 only down to a worn-down load P3 in the characteristic curve 90. Thus, the so-called worn-down load at the time clutch discs 12 and 16 are worn out becomes large. The characteristic curve 90 can afford a decrease in the releasing force required for releasing the clutch to lighten the depressing force required on the clutch pedal.

At the time of clutch releasing, i.e., when the clutch pedal is depressed to actuate release lever 27 and causes the release bearing 26 to move backward, the sleeve part 24 slides with the release bearing 26.

When the sleeve part 24 slides rearward, the retainer 32 is pulled backward against the spring force P of the diaphragm spring 42. Thus, the diaphragm spring 42 takes up the R-position of FIG. 1. In this instance, the inner peripheral side fulcrum 62 of the lever 60 moves backward around the outer peripheral side fulcrum 64 and the intermediate fulcrum also moves backward. The pressure plate 18 is moved backward by the spring force of the strap plate 74 and the pressing state of the clutch discs 12 and 16 is released.

EFFECT OF THE INVENTION

As described above, in the clutch according to the present invention, machining work cost is reduced compared to the pull-type clutch shown in FIG. 6. Because, the sleeve part 24 and the retainer part 32 of the releasing retainer 30 are integrally formed into one piece, the number of parts is reduced, and the structure of the retainer becomes simply as compared with the retainer shown in FIG. 5.

Because the clutch cover 20 and the sleeve part 24 of the releasing retainer 30 are spline fitted by the outer spline tooth 25 and the inner spline tooth 21, there is no need in the present invention for work milling as compared with the studs 117 of the prior pull-type clutches. Therefore, machining costs are further reduced.

Further, there is no need in the diaphragm spring 42 for through holes for studs 117.

Accordingly, the strength of the diaphragm spring 42 can be increased, and the number of machining steps can be reduced.

We claim:

1. In a clutch having a releasing operation by pulling a release bearing away from a flywheel by means of a releasing lever connected to a clutch pedal; a flywheel, a transmission having an input shaft, a clutch disc between said flywheel and said transmission and spline fitted onto said input shaft, a sleeved releasing retainer on the outer periphery of said input shaft, a release bearing fastened to the transmission end of the sleeve part of said retainer, the sleeve part and the releasing retainer part of said sleeved releasing retainer being integrally formed into a one piece unit with said releasing retainer part at the flywheel end of said unit, said releasing retainer part projecting radially outward from said sleeve part at said flywheel end of said unit; a clutch cover connected to said flywheel and covering the pressure plate for pressing said clutch disc against said flywheel; a disc-formed spring member disposed between said clutch cover and said releasing retainer part, a lever transmitting member for transmitting the spring force of said spring member to said pressure plate disposed between said releasing retainer part and said pressure plate; a spline extending outwardly and axially along said sleeve part and extending into an axial spline groove in said clutch cover for permitting axial sliding of said sleeved releasing retainer on said input shaft without rotation relative to said cover.

2. A clutch as set forth in claim 1 in which an annular groove is formed over the entire periphery on an outer surface at the flywheel side end portion of said retainer part.

3. A clutch as set forth in claim 1 in which a pressing part is formed as a projection on said retainer part and facing in a direction opposite to said flywheel, and said pressing part is formed over the entire periphery on an outer surface of said retainer part.

4. A clutch as set forth in claim 3 in which said disc-formed spring member is a diaphragm spring, an inner peripheral part of said diaphragm spring presses against said pressing part of said retainer part, and said inner peripheral part of said diaphragm spring being connected in the circumferential direction of said inner peripheral part by rolled pins provided at plural positions in the circumferential direction on said pressing part.

* * * * *